(12) United States Patent
Sakayori et al.

(10) Patent No.: US 11,370,442 B2
(45) Date of Patent: Jun. 28, 2022

(54) VEHICLE CONTROL DEVICE AND CONTROL METHOD

(71) Applicant: Hitachi Automotive Systems, Ltd., Hitachinaka (JP)

(72) Inventors: Go Sakayori, Tokyo (JP); Tsutomu Kaneko, Tokyo (JP); Masato Imai, Tokyo (JP); Naoyuki Tashiro, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 18 days.

(21) Appl. No.: 17/057,850

(22) PCT Filed: May 8, 2019

(86) PCT No.: PCT/JP2019/018331
§ 371 (c)(1),
(2) Date: Nov. 23, 2020

(87) PCT Pub. No.: WO2019/235117
PCT Pub. Date: Dec. 12, 2019

(65) Prior Publication Data
US 2021/0261133 A1 Aug. 26, 2021

(30) Foreign Application Priority Data
Jun. 4, 2018 (JP) .............................. JP2018-107010

(51) Int. Cl.
*B60W 30/18* (2012.01)
(52) U.S. Cl.
CPC ................. *B60W 30/18163* (2013.01); *B60W 2554/4041* (2020.02); *B60W 2554/802* (2020.02); *B60W 2554/804* (2020.02); *B60W 2556/65* (2020.02)

(58) Field of Classification Search
CPC ... B60W 30/18163; B60W 2554/4041; B60W 2554/802; B60W 2554/804;
(Continued)

(56) References Cited

U.S. PATENT DOCUMENTS

2017/0259819 A1 9/2017 Takeda
2019/0359215 A1* 11/2019 Shimakage ..... B60W 30/18163
(Continued)

FOREIGN PATENT DOCUMENTS

JP 2008-068863 A 3/2008
JP 2008-146168 A 6/2008
(Continued)

OTHER PUBLICATIONS

International Search Report with English translation and Written Opinion issued in corresponding application No. PCT/JP2019/018331 dated Jul. 16, 2019.

*Primary Examiner* — Abby Y Lin
*Assistant Examiner* — Hossam M Abd El Latif
(74) *Attorney, Agent, or Firm* — Foley & Lardner LLP

(57) ABSTRACT

A host lane environment recognition unit acquires an operation of a target vehicle traveling in a host lane and a road environment. An adjacent lane environment recognition unit acquires operation of vehicles traveling in an adjacent lane and a road environment. A lane changeable space determination unit determines whether the host vehicle can change lanes using road environment information of the adjacent lane. A lane change control unit determines whether the target vehicle traveling in the host lane is allowed to change lanes, based on the operation of the target vehicle and the adjacent vehicle traveling in their lanes. The lane change control unit causes the host vehicle to change lanes based on determining whether the host vehicle can change lanes in the adjacent lane by the lane changeable space determination (Continued)

unit and whether or not the target vehicle is allowed to change lanes.

9 Claims, 13 Drawing Sheets

(58) Field of Classification Search
CPC .. B60W 2556/65; B60W 50/14; B60W 30/12; B60W 30/143; B60W 30/16; B60W 40/04; B60W 40/09; B60W 2050/0075; B60W 2050/146; B60W 2420/42; B60W 2420/52; B60W 2520/10; B60W 2556/10; B60K 35/00; B60K 31/00; B60K 2370/334; G08G 1/166; G08G 1/167; B60Y 2400/3015; B60Y 2400/3017
USPC .......................................................... 701/25
See application file for complete search history.

(56) References Cited

U.S. PATENT DOCUMENTS

2020/0339156 A1\* 10/2020 Tsuchiya ......... B60W 60/00276
2021/0245759 A1\* 8/2021 Yonemura ................ G08G 1/22

FOREIGN PATENT DOCUMENTS

| JP | 2015-044432 A |   | 3/2015 |
|----|---------------|---|--------|
| JP | 2015-074426 A |   | 4/2015 |
| JP | 2015074426 A | \* | 4/2015 |
| JP | 2015-232745 A |   | 12/2015 |
| JP | 2016-007954 A |   | 1/2016 |
| JP | 2017-165153 A |   | 9/2017 |

\* cited by examiner

VEHICLE CONTROL DEVICE AND CONTROL METHOD

TECHNICAL FIELD

The present invention relates to a vehicle control device and a control method.

BACKGROUND ART

In order to realize safe and smooth automatic driving control, it is necessary to accurately determine surrounding conditions of a host vehicle and control the vehicle under various environments where road conditions, traffic conditions, or the like are different. In particular, the surrounding conditions are often complicated in a merging lane, a branch lane, or the like, and it is very important to perform safe and smooth automatic driving control.

PTL 1 discloses a vehicle control device of determining a free space behind a preceding vehicle after the preceding vehicle merges into a predetermined free space of a main lane as a target space into which a host vehicle merges, when the preceding vehicle traveling in front of the host vehicle in a merging lane can merge into the predetermined free space of the main lane while the host vehicle is traveling in the merging lane.

CITATION LIST

Patent Literature

PTL 1: JP 2016-7954 A

SUMMARY OF INVENTION

Technical Problem

However, in the vehicle control device disclosed in PTL 1, there is a problem in that when the preceding vehicle traveling in front of the host vehicle cannot merge into the main lane, the host vehicle also cannot merge into the main lane. As a result, not only is there a risk of the host vehicle and surrounding vehicles due to the merging into the main lane, but there is also a risk of disturbing traffic around the host vehicle.

Therefore, an object of the present invention is to safely and smoothly perform a lane change of a host vehicle by an automatic driving control.

Solution to Problem

In order to solve the above problems, there is provided a vehicle control device which performs a control to change a lane of a host vehicle from a first lane to a second lane, including: a first environment acquisition unit which acquires information on an operation of another vehicle traveling in the first lane and a road environment; a second environment acquisition unit which acquires information on an operation of an adjacent vehicle traveling in the second lane and a road environment; a lane changeable space determination unit which determines whether or not there is a space in which the host vehicle is allowed to change lanes in the second lane, based on the information on the road environment of the second lane acquired by the second environment acquisition unit; and a lane change control unit which determines whether or not the other vehicle traveling in the first lane is allowed to change lanes, based on the operation of the other vehicle traveling in the first lane acquired by the first environment acquisition unit and the operation of the adjacent vehicle traveling in the second lane, in which the lane change control unit performs a lane change control of the host vehicle, based on a determination of whether or not there is the space in which the host vehicle is allowed to change lanes in the second lane by the lane changeable space determination unit and a determination of whether or not the other vehicle is allowed to change lanes.

Advantageous Effects of Invention

According to the present invention, a lane of a host vehicle can be safely and smoothly changed by an automatic driving control.

DESCRIPTION OF EMBODIMENTS

<Overall Structure>

Figure 1:
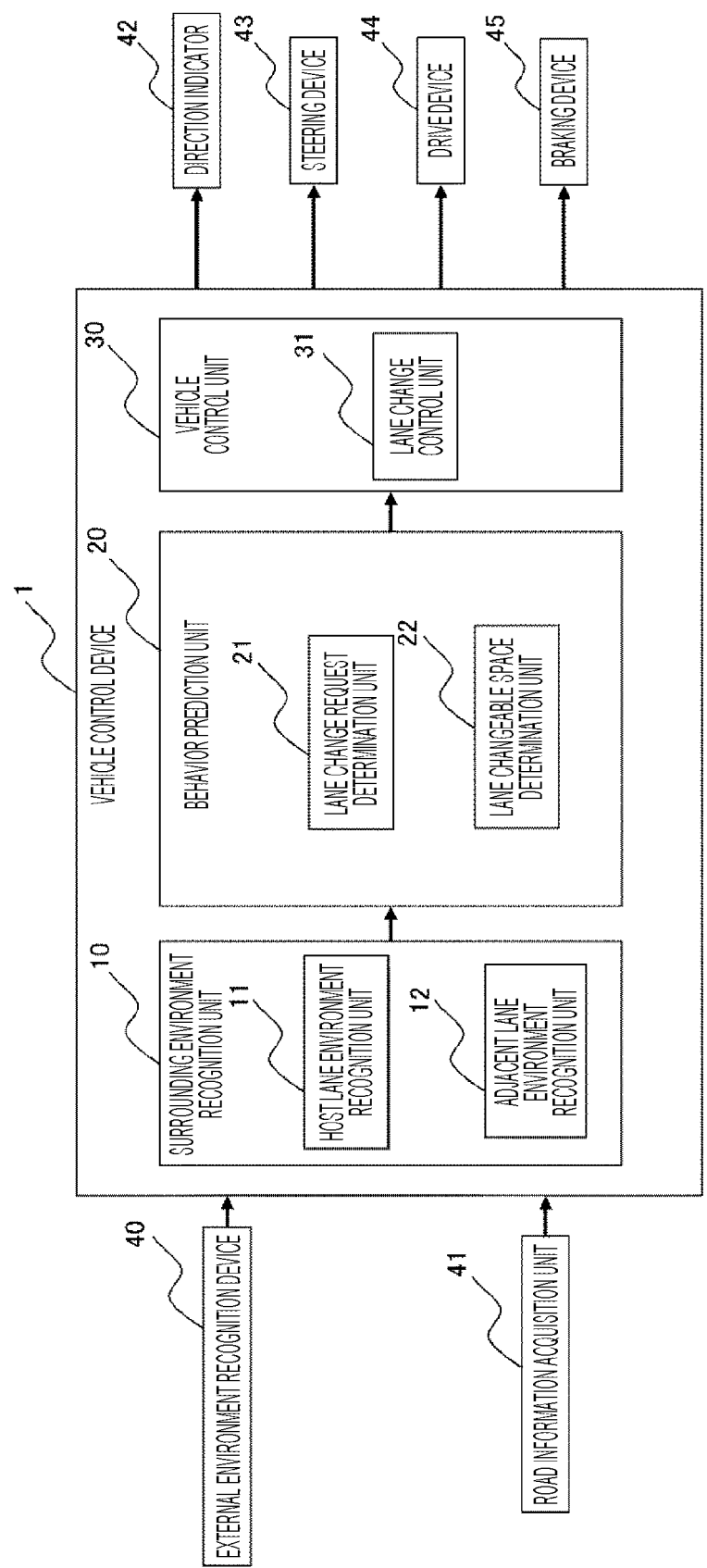
FIG. 1 is a block diagram illustrating a function of a vehicle control device.

Hereinafter, embodiments of the present invention will be described in detail with reference to the drawings. In the embodiment, a case where a vehicle control device 1 according to the present invention is used for a driving control of an automatic driving vehicle (hereinafter, referred to as a host vehicle 100) will be described as an example. In the vehicle control device 1, a Central Processing Unit (CPU) (not illustrated) executes a control program stored in a main memory (not illustrated), and thus, a function (for example, surrounding environment recognition unit 10, behavior prediction unit 20, vehicle control unit 30, or the like) described below is implemented.

FIG. 1 is a block diagram illustrating a function of the vehicle control device 1.

As illustrated in FIG. 1, the vehicle control device 1 is connected to an external environment recognition device 40 and a road information acquisition unit 41 mounted on the host vehicle 100, and by the external environment recognition device 40 and the road information acquisition unit 41, information (for example, inter-vehicle distance and speed) on a preceding vehicle 200 or a rear vehicle (hereinafter, also referred to as a target vehicle) traveling around the host vehicle 100 and adjacent vehicles 300 to 330 or the like traveling in a lane (hereinafter, referred to as an adjacent lane LN2) adjacent to a host lane LN1 is acquired. The external environment recognition device 40 is a device which acquires information on the surrounding environment of the host vehicle 100, and for example, is an in-vehicle stereo camera which captures the front of the host vehicle 100, or an in-vehicle camera which captures the surrounding environments of the front, rear, right side, and left side of the host vehicle 100, respectively. The in-vehicle stereo camera or the in-vehicle camera detects shapes and positions of a stationary three-dimensional object around the host vehicle 100, a moving body, a road surface paint such as a lane dividing line, and an object such as a sign, detects an unevenness or the like of a road surface, and determines whether or not the road surface is a road surface on which the host vehicle 100 can travel. Here, for example, the stationary three-dimensional object includes, a parked vehicle, a wall, a pole, a pylon, a curb, a car stop, or the like. For example, the moving body may be a pedestrian, a bicycle, a motorcycle, a vehicle, or the like.

Further, the in-vehicle stereo camera or the in-vehicle camera, which is an example of the external environment recognition device 40, detects whether or not a brake lamp or a direction indicator of a target vehicle or the like traveling around the host vehicle 100 is lit, or whether or not there is a person in the vehicle. The shape and position of the object can be detected using a pattern matching method or the like. For example, the position of the object can be acquired by applying a coordinate system having an origin to the position of the in-vehicle camera which captures the front of the host vehicle 100. Then, the external environment recognition device 40 outputs the information on a type or distance of the object acquired by the in-vehicle camera or the like, a direction of the object, or the like to the vehicle control device 1 using a dedicated line, Controller Area Network (CAN), or the like. The image data obtained by the in-vehicle camera or the like is output to the vehicle control device 1 from a dedicated line or the like, the image data is processed by the vehicle control device 1, and thus, information on the type and distance of the object, the direction of the object, or the like may be acquired. Further, as long as it is possible to acquire information on the surrounding environment of the host vehicle 100, the external environment recognition device 40 is not limited to the in-vehicle camera or the like and may be a radar which measures a distance to an object or a relative velocity and a direction of the object using millimeter waves or a laser, a sonar which measures a distance to an object using ultrasonic waves, or the like, and information on the distance to the object acquired by radar or sonar, the relative speed, the direction of the object, or the like is output to the vehicle control device 1 using a dedicated line, the CAN, or the like.

The external environment recognition device 40 described above may include a communication device for communicating with the host vehicle 100 and the outside and may communicate with a vehicle (for example, preceding vehicle 200) traveling around the host vehicle 100 so that information on position and speed of each vehicle can be mutually transmitted and received, or information (for example, information on obstacles in the blind spot of the host vehicle 100, or the like) which cannot be detected by a sensor mounted on the host vehicle 100 by communicating with a roadside communication device can be mutually transmitted and received.

For example, the road information acquisition unit 41 is a Global Positioning System (GPS), VICS (registered trademark), or the like, and acquires current map data or traffic information around the host vehicle 100. The acquired map data includes shape data similar to an actual road shape represented by a polygon, a polyline, or the like, and data of traffic regulation information (limiting speed, a type of a vehicle which can pass, or the like), a lane division (main lane, overtaking lane, uphill lane, straight lane, left-turn lane, right-turn lane, or the like), and presence or absence (when it is present, position information thereof) of a traffic light, a sign, or the like.

A direction indicator 42 is a security component of this type of vehicle, and is a device for indicating the direction to the surrounding vehicles when the host vehicle 100 turns right or left or changes a course.

A steering device 43 controls a steering angle of the host vehicle 100 by an electric or hydraulic actuator based on a drive command from the outside. For example, the steering device 43 is configured of an electric power steering, a hydraulic power steering, or the like.

A drive device 44 is configured of an engine system which can control engine torque by an electric throttle based on a drive command from the outside, an electric power train system including a motor capable of controlling a drive force based on a drive command from the outside, or the like.

A braking device 45 is configured of an electric brake, a hydraulic brake, or the like which can control a braking force by an electric or hydraulic actuator based on a braking command from the outside.

<Vehicle Control Device>

Next, a function of the vehicle control device 1 will be described.

As illustrated in FIG. 1, the vehicle control device is configured to include the surrounding environment recognition unit 10, the behavior prediction unit 20, and the vehicle control unit 30.

The surrounding environment recognition unit 10 is configured to include a host lane environment recognition unit 11 and an adjacent lane environment recognition unit 12. The host lane environment recognition unit 11 and the adjacent lane environment recognition unit 12 recognize a vehicle (for example, the preceding vehicle 200 traveling in front of the host vehicle 100 in the host lane LN1 illustrated in FIG. 3 and the adjacent vehicles 300 to 330 traveling in the adjacent lane LN2) traveling in the host lane LN1 and the adjacent lane LN2 (refer to FIG. 3), based on the information on the shape, position, type, or the like of the object detected by the external environment recognition device 40 and the map data and the lane division acquired by the road information acquisition unit 41.

Further, the host lane environment recognition unit 11 and the adjacent lane environment recognition unit 12 calculate a relative position, a relative speed, an acceleration, and determine whether or not the direction indicator of the vehicle (the preceding vehicle 200, the adjacent vehicles 300 to 330) is lit, the vehicle being recognized based on the information detected by the external environment recognition device 40.

The behavior prediction unit 20 has a function of calculating a movement of the host vehicle 100 so that the vehicle can travel safely to a target position of the host vehicle 100. The behavior prediction unit 20 is configured to include a lane change request determination unit 21 and a lane changeable space determination unit 22. The lane change request determination unit 21 determines whether or not a vehicle (for example, the preceding vehicle 200 illustrated in FIG. 3) traveling in the host lane LN1 (refer to FIG. 3) based on the information calculated by the surrounding environment recognition unit 10 requires the lane change. The lane changeable space determination unit 22 determines whether or not there is a space in which the host vehicle 100 can change lanes in the adjacent lane LN2, based on the map data and lane division information acquired by the road information acquisition unit 41, and the information on the relative position, the relative speed, the acceleration, whether or not the direction indicator is lit, or the like of the target vehicle traveling in the host lane LN1 and the adjacent lane LN2 calculated by the surrounding environment recognition unit 10, and when there is the space in which lanes can be changed, the lane changeable space determination unit 22 selects a target space in which the lane is changed from the space.

The vehicle control unit 30 includes a lane change control unit 31. The lane change control unit 31 calculates a target steering angle and a target speed at which the host vehicle 100 can change lanes without colliding with the target vehicle, based on the movement of the host vehicle 100 determined by the behavior prediction unit 20. Then, the lane change control unit 31 outputs target steering torque for realizing the calculated target steering angle to the steering device 43. Moreover, the lane change control unit 31 also outputs a target drive force and a target braking force for realizing the target speed to the drive device 44 and the braking device 45. Here, a control parameter output to the steering device 43 includes the target steering torque for realizing the target steering angle. However, depending on a configuration of the steering device 43, the target steering angle can be directly output to the steering device 43. Further, the control parameters output to the drive device 44 and the braking device 45 include target engine torque, a target brake pressure, or the like for realizing the target speed. However, depending on configurations of the drive device 44 and the braking device 45, the target speed can be directly output to the drive device 44 or the braking device 45. Further, when the host vehicle 100 turns right or a left or changes the course, a driving signal is output to the direction indicator 42 so that the direction indicator 42 performs right turn lighting or left turn light.

<Process of Overall Control>

Next, a flow of an overall control of the vehicle control device 1 will be described.

Figure 2:
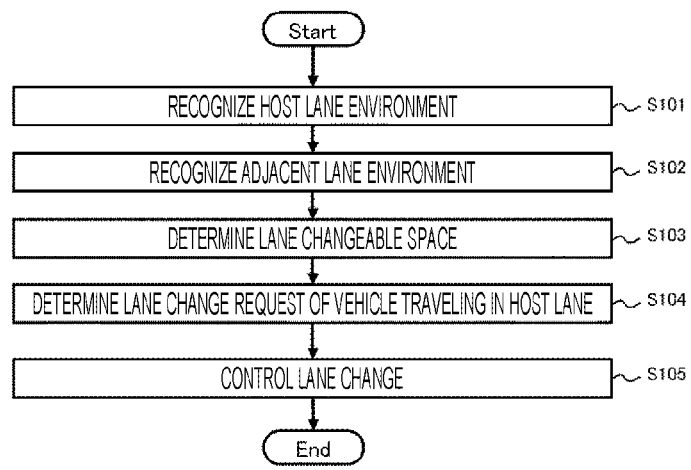
FIG. 2 is a flowchart of a process of an overall control of the vehicle control device.

FIG. 2 is a flowchart of the overall control of the vehicle control device 1.

Figure 3:
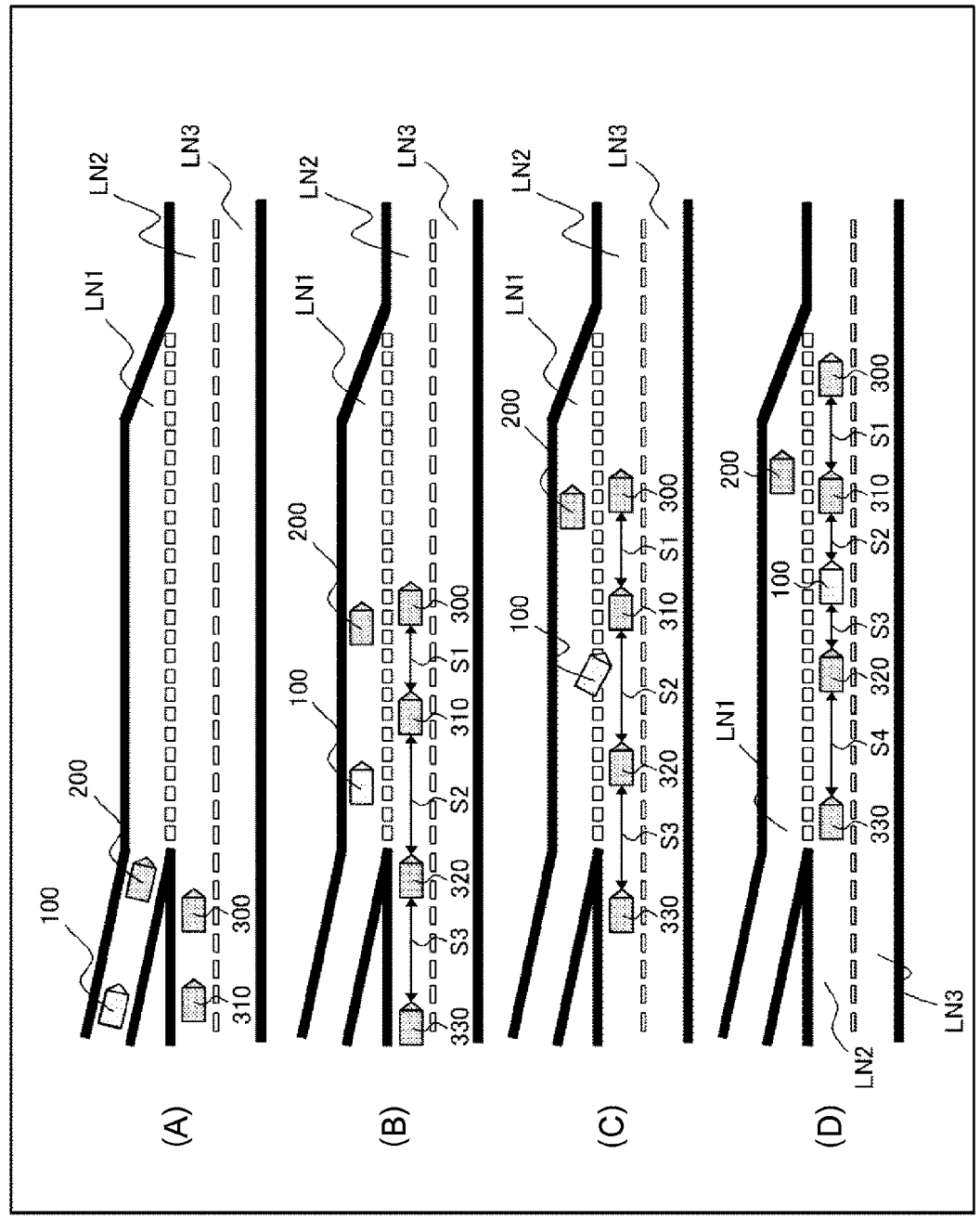
FIG. 3 is a diagram illustrating an example of an operation of a host vehicle controlled by the vehicle control device.

FIG. 3 is a diagram illustrating an example of an operation of the host vehicle 100 controlled by the vehicle control device 1.

First, in Step S101, as illustrated in (A) of FIG. 3, the host lane environment recognition unit 11 of the surrounding environment recognition unit 10 recognizes the target vehicle (the preceding vehicle 200 in the embodiment of FIG. 3) traveling in the host lane LN1 when the host vehicle 100 travels in the host lane LN1 (merging lane in the embodiment of FIG. 3). FIG. 3 illustrates a state where the host vehicle 100 and the preceding vehicle 200 start acceleration in order to merge from the host lane LN1 to the adjacent lane LN2 (main lane in the embodiment of FIG. 3).

In Step S102, as illustrated in (B) of FIG. 3, the adjacent lane environment recognition unit 12 of the surrounding environment recognition unit 10 acquires lane information and information on the adjacent vehicles 300 to 330 traveling in the adjacent lane LN2, based on information on positions, speeds, or the like of the adjacent vehicles 300 to 330 traveling in the adjacent lane LN2 detected by the external environment recognition device 40, and the map data or lane division information acquired by the road information acquisition unit 41.

In Step S103, as illustrated in (B) of FIG. 3, the lane changeable space determination unit 22 of the behavior prediction unit 20 extracts the space (spaces S1 to S3 in the embodiment of FIG. 3) in which the host vehicle 100 can change lanes, based on the information on the positions or the speeds of the adjacent vehicles 300 to 330 traveling in the adjacent lane LN2 acquired in Step S102. For example, the spaces S1 to S3 in which the host vehicle 100 can change lanes are extracted using an inter-vehicle distance or an inter-vehicle time of each of the adjacent vehicles 300 to 330 traveling in the adjacent lane LN2, relative positions and relative speeds between the host vehicle 100 and the adjacent vehicles 300 to 330, or the like. Specifically, in a case where the inter-vehicle times between the host vehicle 100 and the adjacent vehicles 300 to 330, collision margin times between the host vehicle 100 and the adjacent vehicles 300 to 330, or the like are equal to or more than a predetermined threshold value, the distances between the host vehicle 100 and the adjacent vehicles 300 to 330 are sufficient, and it is determined that the space is the lane changeable space. Here, the inter-vehicle time is a value obtained by dividing the inter-vehicle distance between the host vehicle 100 and the adjacent vehicles 300 to 330 by the speed of the host vehicle 100, and the collision margin time indicates a time until the host vehicle 100 collides with the adjacent vehicles 300 to 330 when the host vehicle 100 travels at a current speed of the host vehicle 100.

In Step S104, the lane change request determination unit 21 of the behavior prediction unit 20 predicts whether or not the target vehicle (the preceding vehicle 200 in the embodiment of FIG. 3) traveling in the host lane LN1 acquired in Step S101 performs lane change. Details of the process of Step S104 will be described later.

In Step S105, as illustrated in (C) and (D) of FIG. 3, the lane change control unit 31 of the vehicle control unit 30 controls the steering device 43, the drive device 44, and the braking device 45 based on the lane changeable spaces S1 to S3 extracted in Step S103 and the determination result of whether or not there is a lane change request of the preceding vehicle 200 acquired in Step S104, and performs a control to move the host vehicle 100 to the space S2 in which the lane can be changed most safely and smoothly. Details of the process in Step S105 will be described later.

<Lane Change Request Determination Process>

Next, details of the lane change request determination process by the lane change request determination unit 21 described in Step S104 will be described.

Figure 4:
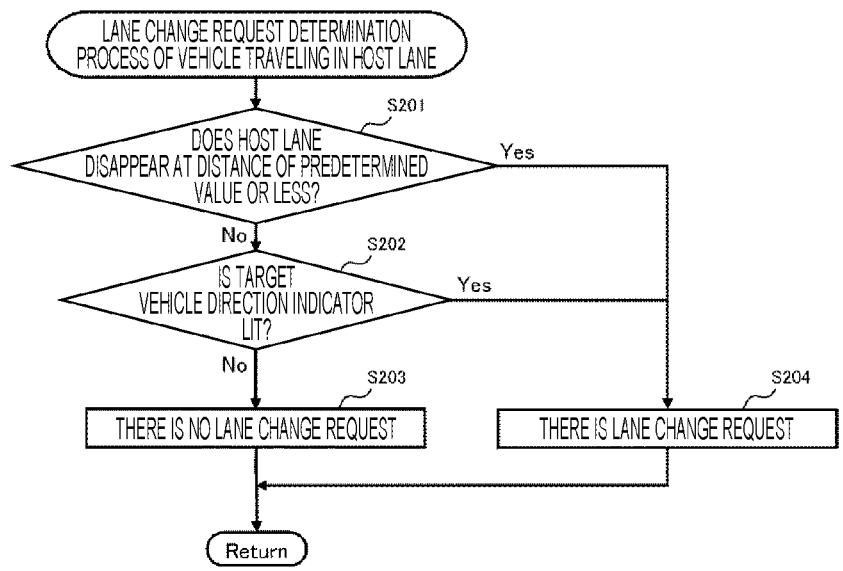
FIG. 4 is a flowchart of a lane change request determination process.

FIG. 4 is a flowchart of the lane change request determination process.

First, in Step S201, the lane change request determination unit 21 determines whether or not the host lane LN1 disappears at a distance of a predetermined value or less (for example, 200 m or less), based on the information (for example, map data) of the host lane LN1 acquired by the host lane environment recognition unit 11 in Step S101 described above. If the lane change request determination unit 21 determines that the host lane LN1 disappears at the distance (for example, 200 m) of the predetermined value or less (Step S201: Yes), it is determined that it is impossible for the target vehicle (for example, the preceding vehicle 200) traveling in the host lane LN1 to continue to travel straight ahead, and the process proceeds to step S204. In Step S204, since it is impossible for the preceding vehicle 200 traveling in the host lane LN1 to continue to travel straight ahead, it is predicted that the preceding vehicle 200 requests to change the lane to the adjacent lane LN2, a flag with the lane change request is set in a memory (not illustrated), and the process ends. Meanwhile, in Step S201, when it is determined that the host lane LN1 does not disappear at a distance of the predetermined value or less (Step S201: No), it is determined that the preceding vehicle 200 traveling in the host lane LN1 can continue to travel straight ahead, and the process proceeds to Step S202.

In Step S202, the lane change request determination unit 21 determines whether or not the direction indicator of the preceding vehicle 200 is lit based on the information of the preceding vehicle 200 traveling in the host lane LN1 acquired in Step S101, and when it is determined that the direction indicator is lit (Step S202: Yes), the process proceeds to step S204, the flag with the lane change request is set in the memory, and the process ends. Meanwhile, when the lane change request determination unit 21 determines that the direction indicator of the preceding vehicle 200 is not lit (Step S202: No), it is determined that the preceding vehicle 200 can continue to travel straight ahead and has no intention of changing the lane, the process proceeds to Step S203, a flag without the lane change request is set in the memory, and the process ends.

<Lane Change Control Process>

Next, details of the lane change control process described in step 105 will be described.

Figure 5:
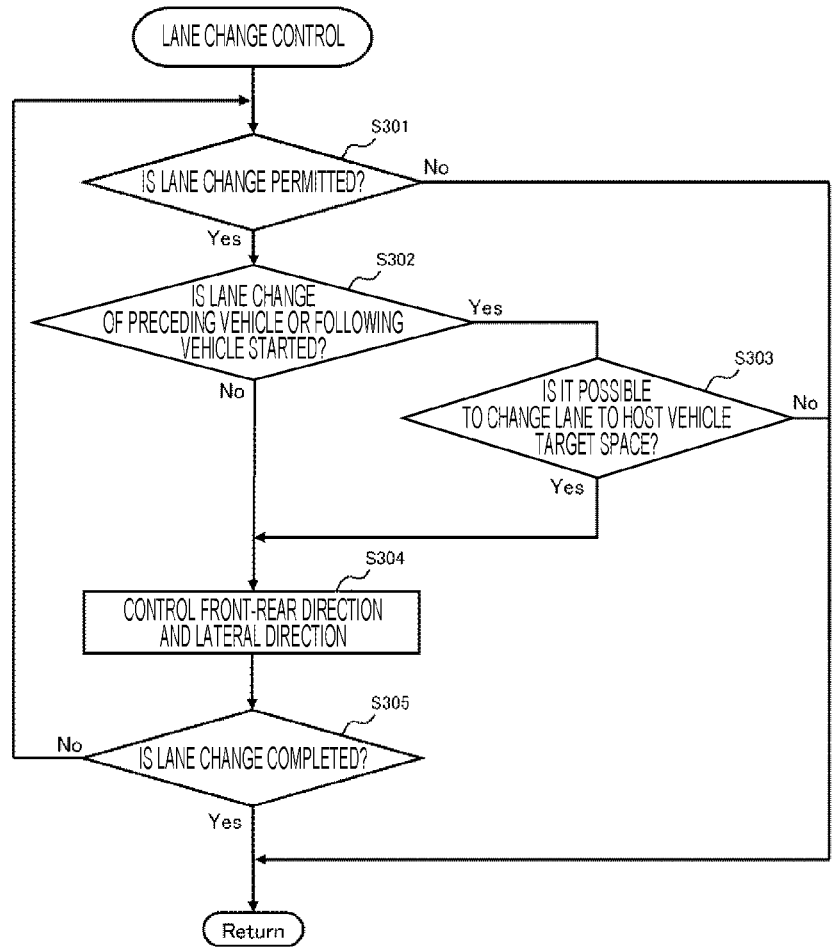
FIG. 5 is a flowchart of a lane change control process.

FIG. 5 is a flowchart of the lane change control process.

Figure 8:
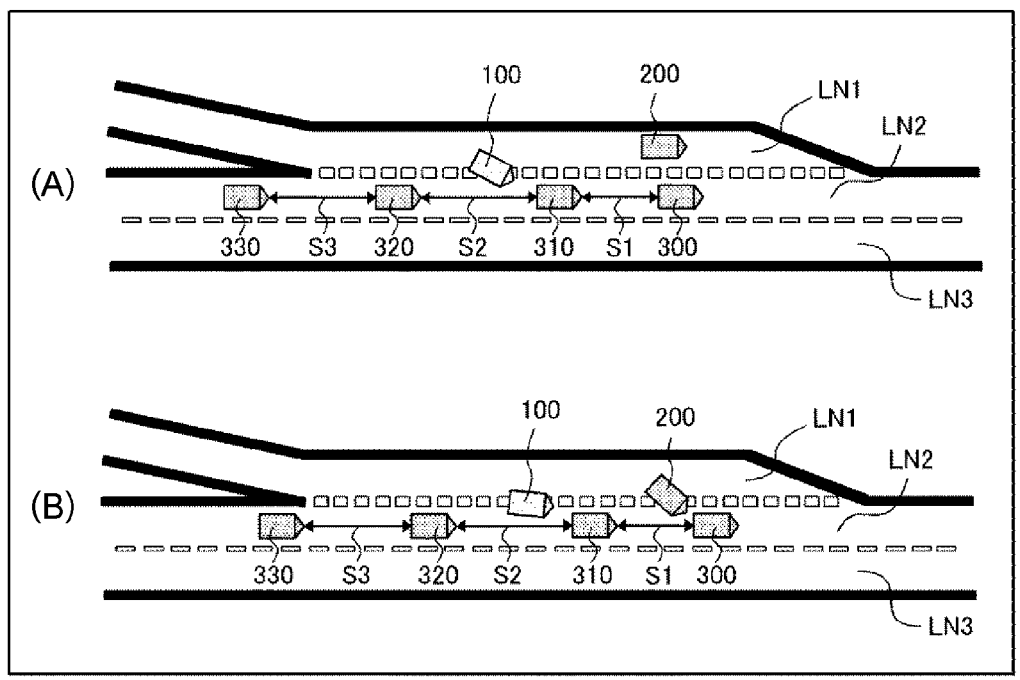
FIG. 8 is a diagram illustrating an example of a lane change operation of the host vehicle.

FIG. 8 is a diagram illustrating an example of a lane change operation of the host vehicle 100.

Figure 9:
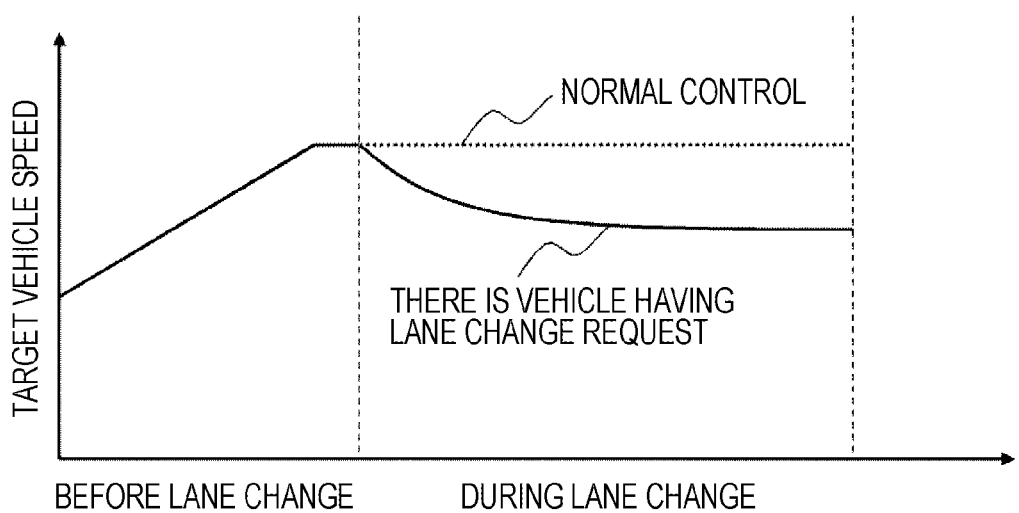
FIG. 9 is a diagram illustrating an example of a speed control of the host vehicle.

FIG. 9 is a diagram illustrating an example of a speed control of the host vehicle 100.

In Step S301, the lane change control unit 31 determines whether or not a flag indicating a permission of the lane change to the adjacent lane LN2 of the host vehicle 100 is set in the memory, and when it is determined that the flag indicating the permission of the lane change is set in the memory (Step S301: Yes), the process proceeds to Step S302, and when it is determined that the flag indicating the permission of the lane change is not set in the memory (Step S301: No), the process ends. Details of the processing in Step S301 will be described later.

In Step S302, the lane change control unit 31 determines whether or not the target vehicle (for example, the preceding vehicle 200 or the following vehicle) traveling in the host lane LN1 has started the lane change, based on the information acquired by the host lane environment recognition unit 11, when it is determined that the preceding vehicle 200 or the following vehicle has started the lane change (Step S302: Yes), the process proceeds to Step S303, and when it is determined that the preceding vehicle 200 or the following vehicle has not started the lane change (Step S302: No), the process proceeds to Step S304.

In Step S303, the lane change control unit 31 can secure the space of the target space in which the host vehicle 100 plans to change the lane by changing the lane of the preceding vehicle 200 or the following vehicle traveling in the host lane LN1, and determines whether or not the host vehicle 100 can continuously change the lane. When the lane change control unit 31 determines that the lane change can be continued in the target space of the adjacent lane LN2 (Step S303: Yes), the process proceeds to Step S304, and when it is determined that the lane change to the target space of the adjacent lane LN2 is impossible (Step S303: No), the process ends without continuing the control for changing the lane. For example, as illustrated in (A) of FIG. 8, the host vehicle 100 is in a state where the lane change is started to the target space (space S2) in which it is determined that lanes can be changed. In a state where the lane change of the host vehicle 100 to the target space (space S2) is not completed, as illustrated in (B) of FIG. 8, the preceding vehicle 200 tries to change the lane to the space S1, and thus, the adjacent vehicle 310 traveling in the adjacent lane LN2 slows down to secure a safe inter-vehicle distance. As a result, the target space (space S2) which is the target of the lane change of the host vehicle 100 becomes narrow, and it may not be possible to change the lane. In this case, the lane change control unit 31 stops the lane change operation of the host vehicle 100 and performs a control so that the host vehicle 100 evacuates to the host lane LN1 (merging lane).

In Step S304, the lane change control unit 31 controls the host vehicle 100 in a front-rear direction or a lateral direction based on the information of the surrounding environment recognition unit 10 and the information of the target space in which the lane can be changed selected by the behavior prediction unit 20, and controls to move the host vehicle 100 from the host lane LN1 to the target space (for example, the space S2 illustrated in FIG. 3) of the adjacent lane LN2. In the control of the host vehicle 100 in the front-rear direction or the lateral direction by the lane change control unit 31, as illustrated in FIG. 9, before the host vehicle 100 starts the lane change, the lane change control unit 31 accelerates to a preset target speed (for example, 100 km/h) to change the lane, and is laid sideways in the target space of the adjacent lane LN2. As the control during the lane change of the host vehicle 100, when there is not another vehicle (for example, the preceding vehicle 200) which has the lane change request around the host vehicle 100, a normal lane change control is performed while keeping the target speed constant (dotted lines in FIG. 9). Meanwhile, when there is the other vehicle which has the lane change request around the host vehicle 100, the lane change control unit 31 performs the control so that the target speed of the host vehicle 100 slowly decreases compared to a case where there is the other vehicle having the lane change request while changing the lane of the host vehicle 100 (solid line in FIG. 9). As a result, the space in front of the host vehicle 100 is expanded, the possibility that the preceding vehicle 200 can change the lane increases, both the host vehicle 100 and the preceding vehicle 200 can change the lane without staying, and a flow of traffic can be safe and smooth.

In Step S305, the lane change control unit 31 determines whether the host vehicle 100 has completed the lane change to the target space (for example, the space S2 illustrated in FIG. 3). When the lane change control unit 31 determines that the lane change of the host vehicle 100 has been completed (Step S305: Yes), the process ends, and when it is determined that the lane change of the host vehicle 100 has not been completed (Step S305: No), the process returns to Step S301 again to execute the lane change control of Steps S301 to S304.

<Lane Change Permission Process>

Next, the lane change permission process described in Step S301 will be described in detail.

Figure 6:
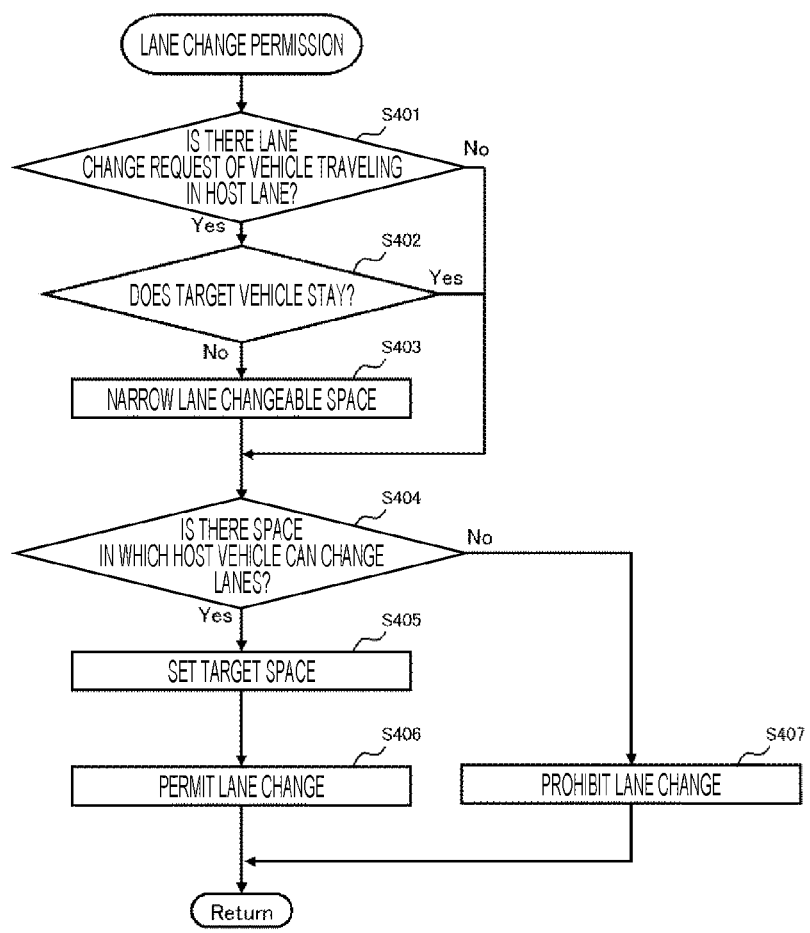
FIG. 6 is a flowchart of a lane change permission process.

FIG. 6 is a flowchart of the lane change permission process.

In Step S401, the lane change control unit 31 determines whether or not there is a request for the lane change of the target vehicle (for example, the preceding vehicle 200) traveling in the host lane LN1, based on the flag with the lane change request or the flag without the lane change request set by the lane change request determination unit 21. When the lane change control unit 31 determines that the flag with the lane change request of the preceding vehicle 200 is set in the memory (Step S401: Yes), the process proceeds to Step S402, and when the lane change control unit 31 determines that the flag without the lane change request is set in the memory (Step S401: No), the process proceeds to Step S404.

In Step S402, the lane change control unit 31 determines whether or not the target vehicle (for example, the preceding vehicle 200) traveling in the host lane LN1 stays in the host lane LN1, based on the information of the host lane environment recognition unit 11. When the lane change control unit 31 determines that the target vehicle stays (Step S402: Yes), the process proceeds to Step S404, and when the lane change control unit determines that the target vehicle does not stay (Step S402: No), the process proceeds to Step S403. Details of the processing in Step S402 will be described later.

In Step S403, the lane change control unit 31 predicts a space to be selected as a lane change destination by the target vehicle which has a vehicle change request of the target vehicle traveling in the host lane LN1 and is not in the staying state. The space in which the host vehicle 100 can change lanes is narrowed down based on this result and the lane changeable space candidates extracted by the lane changeable space determination unit 22. When the space extracted by the lane changeable space determination unit 22, that is, the space predicted as the lane change destination of the target vehicle traveling in the host lane LN1 are sufficiently wide, and safety can be ensured even when two vehicles changes the lanes to the same space at the same time, the spaces may be the space in which the host vehicle 100 can change lanes. Accordingly, it is possible to efficiently and smoothly change the lane.

In Step S404, the lane change control unit 31 determines whether or not there is the space in which the host vehicle 100 can change lanes and which is narrowed down in Step S403, and when it is determined that at least one lane changeable space exists (Step S404: Yes), the process proceeds to Step S405. Meanwhile, when the lane change control unit 31 determines that there is no space in which the host vehicle 100 can change lanes (Step S404: No), the process proceeds to Step S407, and since the lane change of the host vehicle 100 is impossible, a flag indicating a prohibition of the lane change is set in the memory, and the process ends.

In Step S405, the lane change control unit 31 sets an optimum space as the target space, from the spaces (for example, the spaces S1 to S3 illustrated in FIG. 3) extracted as the spaces in which the host vehicle 100 can change lanes. Specifically, the lane change control unit 31 calculates, with respect to the plurality of spaces S1 to S3 extracted as the lane changeable space, evaluation values of the respective spaces S1 to S3 using an evaluation function which weights at least one or more indicators, such as sizes of the spaces S1 to S3, the inter-vehicle distance or the inter-vehicle time to the target vehicle after changing the lane, or an acceleration profile required to change the lane. Then, the lane change control unit 31 sets a space (space S2 in the embodiment illustrated in FIG. 3) having a highest evaluation value thereof as the target space, and the process proceeds to Step S406. As a result, the lane change control unit 31 can change the lane of the host vehicle 100 to the safest lane changeable space (the space S2 in the embodiment), and thus, the host vehicle 100 can be safely and smoothly merged.

In Step S406, the lane change control unit 31 sets the flag indicating the permission for the lane change in the memory and ends the process.

<Target Vehicle Stay Determination Process>

Next, the target vehicle stay determination process described in Step S402 will be described in detail.

Figure 7:
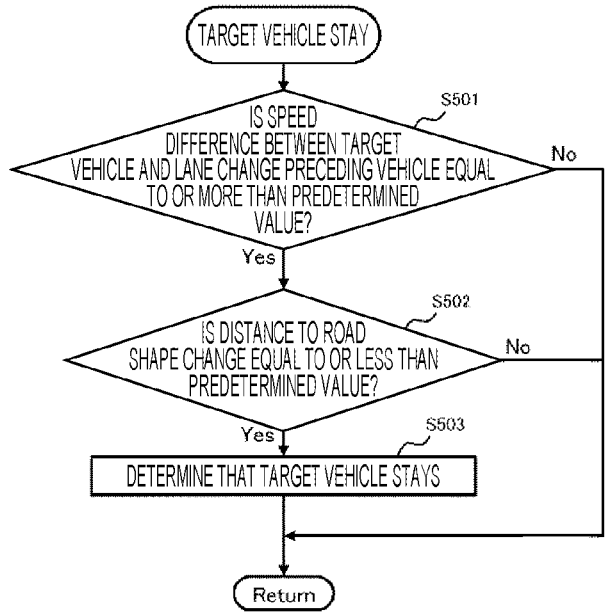
FIG. 7 is a flowchart of target vehicle stay determination process.

FIG. 7 is a flowchart of the target vehicle stay determination process.

In Step S501, the lane change control unit 31 determines whether or not a speed difference between the target vehicle (preceding vehicle 200 or a following vehicle) traveling in the host lane LN1 and the adjacent vehicles 300 to 330 traveling in the adjacent lane LN2 is equal to or more than a predetermined threshold value (for example, 30 km/h), based on the information acquired by the host lane environment recognition unit 11 and the adjacent lane environment recognition unit 12. When the lane change control unit 31 determines that the speed difference between the target vehicle traveling in the host lane LN1 and the adjacent vehicles 300 to 330 traveling in the adjacent lane LN2 is equal to or more than the predetermined threshold value (Step S501: Yes), the process proceeds to Step S502, and when it is determined that the speed difference is not equal to or more than the predetermined threshold value (Step S501: No), the speed of the target vehicle is sufficiently fast and the lane can be changed to the adjacent lane LN2, and as a result, it is determined that no stay will occur, and the process ends.

In Step S502, the lane change control unit 31 determines whether or not a distance until the road shape change of the host lane LN1 acquired by the host lane environment recognition unit 11 is equal to or less than a predetermined distance. When the lane change control unit 31 determines that the distance to the road shape change is equal to or less than the predetermined distance (Step S502: Yes), the process proceeds to Step S503, and when the lane change control unit determines that the distance to the road shape change is not equal to or less than the predetermined distance (Step S503: No), the speed difference between the target vehicle and the adjacent vehicles 300 to 330 traveling in the adjacent lane LN2 is large, but the distance necessary for acceleration to eliminate the speed difference can be sufficiently secured, and as a result, it is determined that the target vehicle does not stay, and the process ends. The road shape change means a position at which the road shape on which the host vehicle is currently traveling greatly changes, and examples thereof include a merging position (FIG. 3), a branching position (FIG. 15) of the lane, or the like.

In Step S503, the lane change control unit 31 determines that the speed difference between the target vehicle traveling in the host lane LN1 and the adjacent vehicles 300 to 330 traveling in the adjacent lane LN2 is equal to or more than the predetermined value and the distance required for acceleration to eliminate the speed difference is insufficient, and as a result, it is determined that the target vehicle is in the staying state, and the process ends.

As described above, in the embodiment, (1) there is provided the vehicle control device 1 which performs the control to change the lane of the host vehicle 100 from the host lane LN1 (first lane) to the adjacent lane LN2 (second lane), including: the host lane environment recognition unit 11 (first environment acquisition unit) which acquires the information (image data, information on lane division, or the like) on the operation of the target vehicle (another vehicle) traveling in the host lane LN1 and the road environment, the adjacent lane environment recognition unit 12 (second environment acquisition unit) which acquires the information (image data, information on lane division, or the like) on the operations of the adjacent vehicles 300 to 330 traveling in the adjacent lane LN2 and the road environment, the lane changeable space determination unit 22 which determines whether or not there are the spaces S1 to S3 in which the host vehicle 100 is allowed to change lanes in the adjacent lane LN2, based on the information on the road environment of the adjacent lane LN2 acquired by the adjacent lane environment recognition unit 12, and the lane change control unit 31 which determines whether or not the target vehicle traveling in the host lane LN1 is allowed to change lanes, based on the operation of the target vehicle traveling in the host lane LN1 acquired by the host lane environment recognition unit 11 and the operations of the adjacent vehicles 300 to 330 traveling in the adjacent lane LN2, in which the lane change control unit 31 performs the lane change control of the host vehicle 100, based on the determination of whether or not there are the spaces S1 to S3 in which the host vehicle 100 is allowed to change lanes in the adjacent lane LN2 by the lane changeable space determination unit 22 and the determination of whether or not the target vehicle is allowed to change lanes.

According to this configuration, the lane change control unit 31 determines whether to change the lane of the host vehicle 100 based on existence of the spaces S1 to S3 in which the host vehicle 100 can change lanes and whether or not the lane of the target vehicle can be changed, and thus, the lane of the host vehicle can be changed safely and smoothly by the automatic driving control.

(2) Moreover, in the case where the distance from the target vehicle traveling in the host lane LN1 to the road shape change position (merging position of the host lane LN1 of FIG. 3) of the host lane LN1 is equal to or less than the predetermined distance, or in the case where the direction indicator of the target vehicle LN1 is lit and the speed difference between the target vehicle traveling in the host lane LN1 and the adjacent vehicles 300 to 330 traveling in the adjacent lane LN2 is equal to or more than the predetermined speed (for example, 30 km/h), the lane change control unit 31 determines that the lane change of the target vehicle traveling in the host lane LN1 is not allowed.

According to this configuration, when the distance to the road shape change position of the host lane LN1 of the target vehicle traveling in the host lane LN1 is small, or when the direction indicator of the target vehicle is lit, the lane change control unit 31 determines that there is the lane change request of the target vehicle. However, when the speed difference between the target vehicle and the adjacent vehicles 300 to 330 is equal to or more than the predetermined speed (for example, 30 km/h), the speed difference between the target vehicle and the adjacent vehicles 300 to 330 is large and it is difficult to safely change the lane, and thus, it is determined that the lane of the target vehicle cannot be changed. Therefore, when the lane of the target vehicle cannot be changed safely and smoothly, the lane change of the host vehicle 100 can be performed with priority without waiting for the lane change of the target vehicle.

(3) Further, the lane change control unit 31 calculates a size of a space when the target vehicle changes lanes in the adjacent lanes 300 to 330 when it is determined that the target vehicle traveling in the host lane LN1 is allowed to change lanes, permits or continues the lane change of the host vehicle 100 when the calculated size of the space is equal to or more than the predetermined value, and prohibits the lane change of the host vehicle 100 when the calculated size of the space is less than the predetermined value.

According to this configuration, when the space in the adjacent vehicle LN2 in which the target vehicle is determined to be capable of changing lanes is sufficiently large, the lane change of the target vehicle has little effect on the lane change of the host vehicle 100, and thus, the lane change control unit 31 safely and smoothly can change the lane of the host vehicle 100 to the space in which the host lane 100 is determined to be capable of changing lanes.

(4) Further, the size of the space calculated by the lane change control unit 31 is set to a size in which the host vehicle 100 and the target vehicle traveling in the host lane LN1 are allowed to change lanes at the same time.

According to this configuration, the lane change control unit 31 can change the lanes of the host vehicle 100 and the target vehicle to the same space in which it is determined that the target vehicle can change lanes, and thus, safety is ensured. The lane can be changed more efficiently and smoothly.

(5) Further, when the lane change control unit 31 determines that the lane change of the target vehicle traveling in the host lane LN1 is not allowed, the lane change control unit 31 controls the speed of the host vehicle 100 in the front-rear direction while changing the lane of the host vehicle 100 from the host lane LN1 to the adjacent lane LN2 to change the size of any space of the host vehicle 100 in the front-rear direction in the adjacent lane LN2 to the size which allows the lane change of the target vehicle.

According to this configuration, the lane change control unit 31 can create the space in which the target vehicle can changes lanes while changing the lane of the host vehicle 100, and thus, it is possible to prompt the lane change of the target vehicle. Therefore, the lane can be changed more smoothly without disturbing the flow of traffic on the road.

Second Embodiment

Next, a vehicle control device 1A according to a second embodiment of the present invention will be described. The vehicle control device 1A according to the second embodiment is different from the above-described vehicle control device 1 in that a vehicle control unit 30A has a post-lane change control unit 32, and after the host vehicle 100 changes lanes, the speed of the host vehicle 100 in the front-rear direction is controlled in order to safely and smoothly perform the lane change of the preceding vehicle 200 or the rear vehicle, and a notification device 46 which notifies the preceding vehicle 200 or the like of a result thereof is provided.

Figure 10:
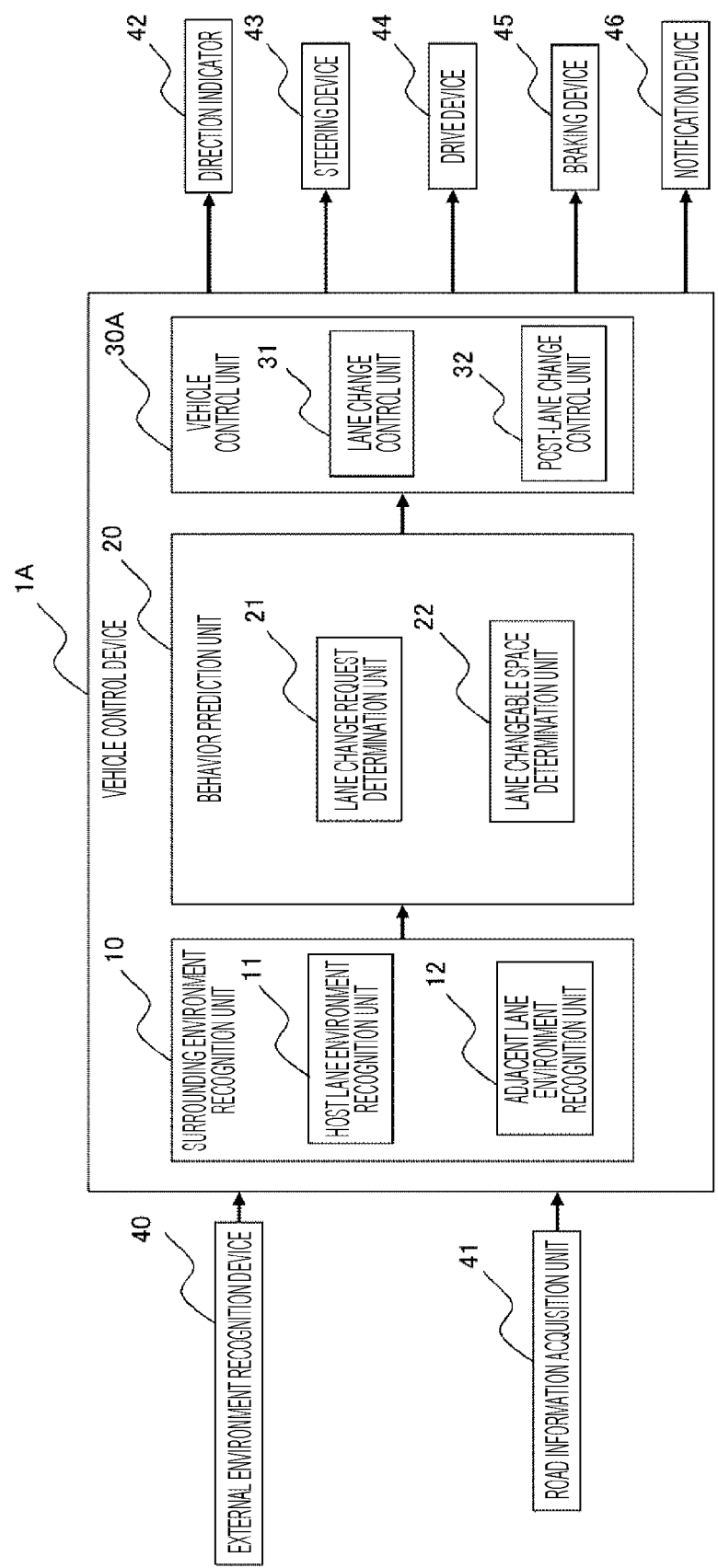
FIG. 10 is a block diagram illustrating a function of a vehicle control device according to a second embodiment.

FIG. 10 is a block diagram illustrating a function of the vehicle control device 1A according to the second embodiment. In the second embodiment, the same components and functions as those in the first embodiment are designated by the same reference numerals and will be described as needed.

As illustrated in FIG. 10, the vehicle control unit 30A further includes the post-lane change control unit 32. In a case where the post-lane change control unit 32 can secure the space in which the target vehicle can change lanes by controlling the speed of the host vehicle 100 in the front-rear direction when the target vehicle (for example, the preceding vehicle 200) having the lane change request exists after the host vehicle 100 changes lanes, the speed is controlled in the front-rear direction to create the space in which the target vehicle can change lanes. Then, the post-lane change control unit 32 transmits a signal for notifying that the space in which the target vehicle can change lanes is secured to the notification device 46. The notification device 46 notifies the target vehicle that the space where the lane can be changed is secured, based on the signal received from the post-lane change control unit 32.

<Overall Control>

Next, a process of an overall control of the vehicle control device 1A will be described.

Figure 11:
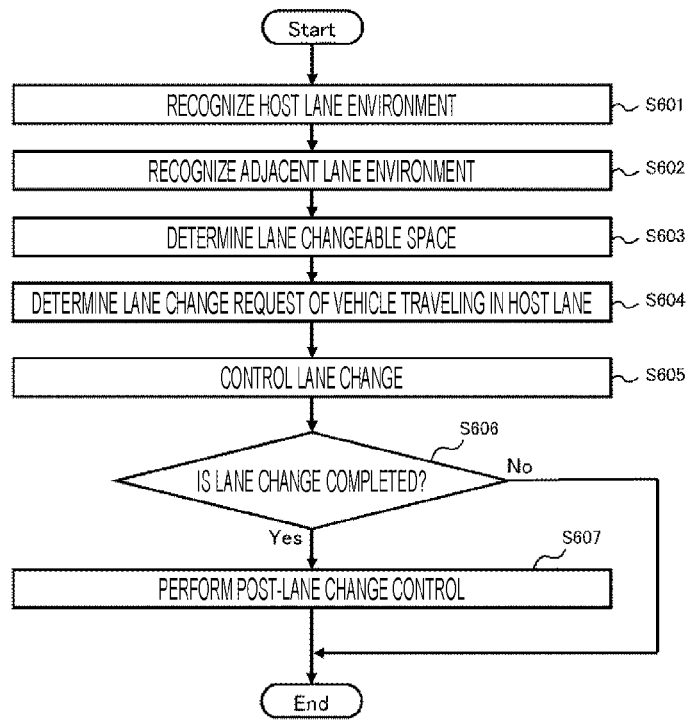
FIG. 11 is a flowchart of a process of an overall control of the vehicle control device according to the second embodiment.

FIG. 11 is a flowchart of the process of the overall control of the vehicle control device 1A. Here, since processes from Step S601 to Step S605 are the same as the Steps S101 to S105 of the overall control described with reference to FIG. 2 described above, descriptions thereof will be omitted.

In Step S606, the lane change control unit 31 of the vehicle control unit 30A determines whether or not the lane change of the host vehicle 100 has been completed, and when it is determined that the lane change has been completed (Step S606: Yes), the process proceeds to Step S607, and when it is determined that the lane change has not been completed (Step S606: No), the process ends. Here, as an example of a situation in which it is determined that the lane change of the host vehicle 100 has not been completed, there is a case where the space in which the host vehicle 100 can change lanes does not exist, a case where the lane change is interrupted, or the like.

In Step S607, the post-lane change control unit 32 performs a post-lane change control when the lane change of the host vehicle 100 has been completed, and ends the process. Details of the process of Step S607 will be described later.

<Post-Lane Change Control>

Next, details of the post-lane change control by the post-lane change control unit 32 described in Step S607 will be described.

Figure 12:
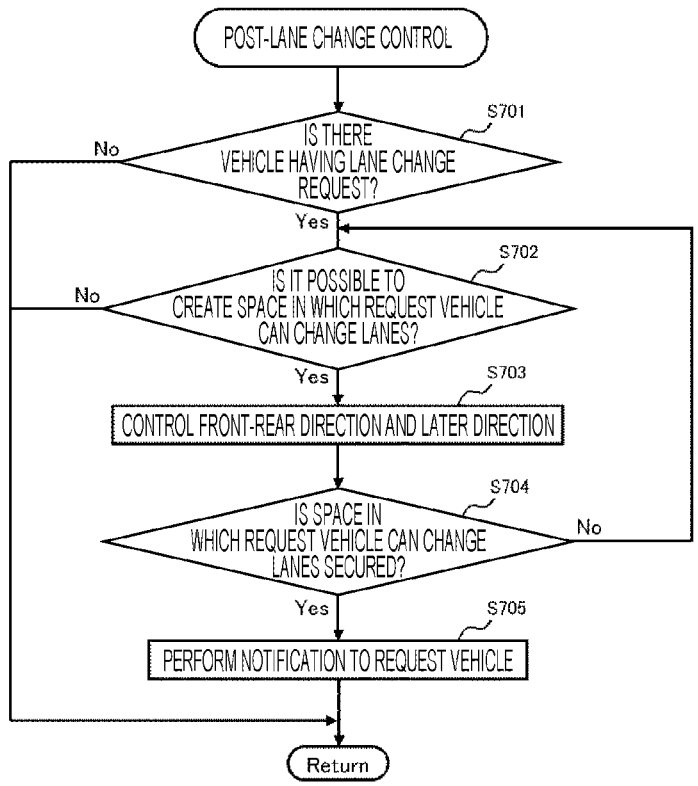
FIG. 12 is a flowchart of a process after lane change.

FIG. 12 is a flowchart illustrating the process of the post-lane change control.

In Step S701, the post-lane change control unit 32 determines by the lane change request determination unit 21 whether or not there is a target vehicle having the lane change request among the target vehicles traveling in the host lane LN1, when it is determined that the target vehicle exists (Step S701: Yes), the process proceeds to Step S702, and when it is determined that the target vehicle does not exist (Step S701: No), since it is not necessary to change the lane of the target vehicle (for example, the preceding vehicle 200) after the lane of the host vehicle 100 is changed, the process end.

In Step S702, the post-lane change control unit 32 determines whether or not it is possible to create the space in which the target vehicle having the lane change request can change lanes by controlling the speed of the host vehicle 100 in the front-rear direction or the like. When the post-lane change control unit 32 determines that the target vehicle having the lane change request can create a space sufficient for changing lanes (Step S702: Yes), the process proceeds to Step S703, and when the post-lane change control unit 32 determines that the target vehicle having the lane change request cannot create the space sufficient for changing lanes (Step S702: No), the process ends.

Here, whether or not the lane change is possible is determined by calculating how much space is required for the target vehicle to change lanes from the position of the target vehicle (for example, the preceding vehicle 200), the relative speed between the host vehicle 100 and the target vehicle, or the like. Here, a new preceding vehicle or following vehicle (also referred to as a new target vehicle) means a preceding vehicle (for example, the vehicle 310 illustrated in FIG. 14) and a following vehicle (for example, the vehicle 320 illustrated in FIG. 14) which are traveling in the changed lane after changing the lane. Further, in order to create the space in which the target vehicle having the lane change request can change lanes, the vehicle control device 1A may perform a front-rear control and a lateral control of the host vehicle 100 so that the lane of the host vehicle 100 is changed to a lane (adjacent lane LN3 illustrated in FIG. 14) further adjacent to the lane after the host vehicle 100 changes lanes.

Here, an example of a speed control of the vehicle 100 for creating the space required for the lane change of the target vehicle having the lane change request after the lane change of the host vehicle 100 will be described.

Figure 13:
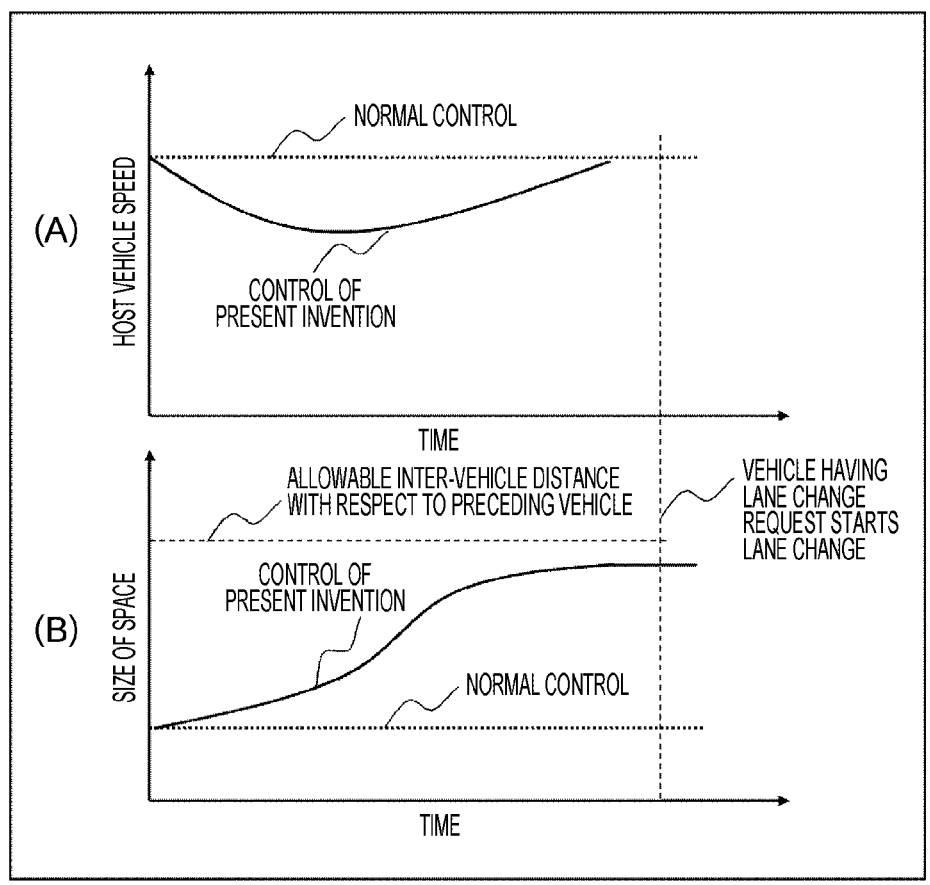
FIG. 13 is a diagram illustrating an example of a speed control of a host vehicle according to the second embodiment.

FIG. 13 is a diagram illustrating an example of the speed control of the host vehicle 100. (A) of FIG. 13 illustrates a time transition of the target speed of the host vehicle 100, in which a normal control is indicated by dotted lines and the control by the vehicle control device LA is indicated by a solid line. (B) of FIG. 13 illustrates a time transition of the inter-vehicle distance (space) between the host vehicle 100 and the preceding vehicle (the preceding vehicle 310 illustrated in FIG. 14), in which a normal control is indicated by dotted lines, and the control by the vehicle control device 1A is indicated by a solid line.

As illustrated in (A) of FIG. 13, after the lane of the host vehicle 100 is changed, the target speed of the host vehicle 100 is made lower than that in the normal time, and thus, the inter-vehicle distance to the preceding vehicle (the preceding vehicle 310 in FIG. 14) increases, and as illustrated in (B) of FIG. 13, the size of the space between the host vehicle 100 and the preceding vehicle gradually increases. Here, the target speed of the host vehicle 100 is set so as to be suppressed within a predetermined deceleration. As a result, it is possible to prevent the following vehicle (for example, the following vehicle 320 illustrated in FIG. 14) from feeling fear due to a sudden deceleration of the host vehicle 100. Further, this predetermined deceleration may be set to increase as the inter-vehicle distance to the following vehicle increases. As a result, the space with respect to the preceding vehicle (the preceding vehicle 310 in FIG. 14) can be made large enough in a short time so that the target vehicle (vehicle 200) having the lane change request can change lanes. Therefore, the target vehicle having the lane change request can easily enter the space in which the lane is to be changed. Even if the inter-vehicle distance between the host vehicle 100 and the preceding vehicle (preceding vehicle 310 in FIG. 14) is made too long, there is a possibility that the traffic flow may be impaired, and thus, an allowable inter-vehicle distance from the preceding vehicle may be provided (refer to dashed lines in (B) of FIG. 13). The post-lane change control unit 32 increases the target speed of the host vehicle 100 so that the distance between the host vehicle 100 and the preceding vehicle does not exceed an allowable lane change distance (not too far) so as to perform a control for adjusting the distance from the preceding vehicle. Further, an inter-vehicle time between the host vehicle 100 and the preceding vehicle may be used instead of the inter-vehicle distance between the host vehicle 100 and the preceding vehicle. After the post-lane change control unit 32 secures a sufficient space for the target vehicle having the lane change request to change lanes, the post-lane change control unit 32 sets the target speed of the host vehicle 100 to be the same as that of the preceding vehicle so that the inter-vehicle distance from the preceding vehicle does not increase to be equal to or more than the secured space (refer to (B) of FIG. 13), and waits for the target vehicle having the lane change request to start the lane change.

Returning to FIG. 12, in Step S703, based on information indicating that the target vehicle having the lane change request determined in Step S702 can create the lane changeable space, the post-lane change control unit 32 performs the control in the front-rear direction or the lateral direction in order to secure a space in which the target vehicle having the lane change request can change lanes.

In Step S704, the post-lane change control unit 32 determines whether or not the target vehicle having the lane change request can secure a sufficient space for the lane change, and when it is determined that the sufficient space can be secured (Step S704: Yes), the process proceeds to Step S705, and when it is determined that sufficient space cannot be secured (Step S704: No), the process returns to Step 702 again to continue the post-lane change control.

In Step S705, the post-lane change control unit 32 performs a notification on the target vehicle in order to notify the target vehicle having the lane change request that the target vehicle may change the lane to the space created by the host vehicle 100. Here, an example of the notification includes inter-vehicle communication, or the like.

As a result, it is possible to prevent the target vehicle having the lane change request from staying, and to suppress deterioration of a traffic flow in a merge section.

<Operation Example of Host Vehicle by Post-Lane Change Control>

Next, an example of an operation of the host vehicle 100 controlled by the post-lane change control unit 32 will be described.

Figure 14:
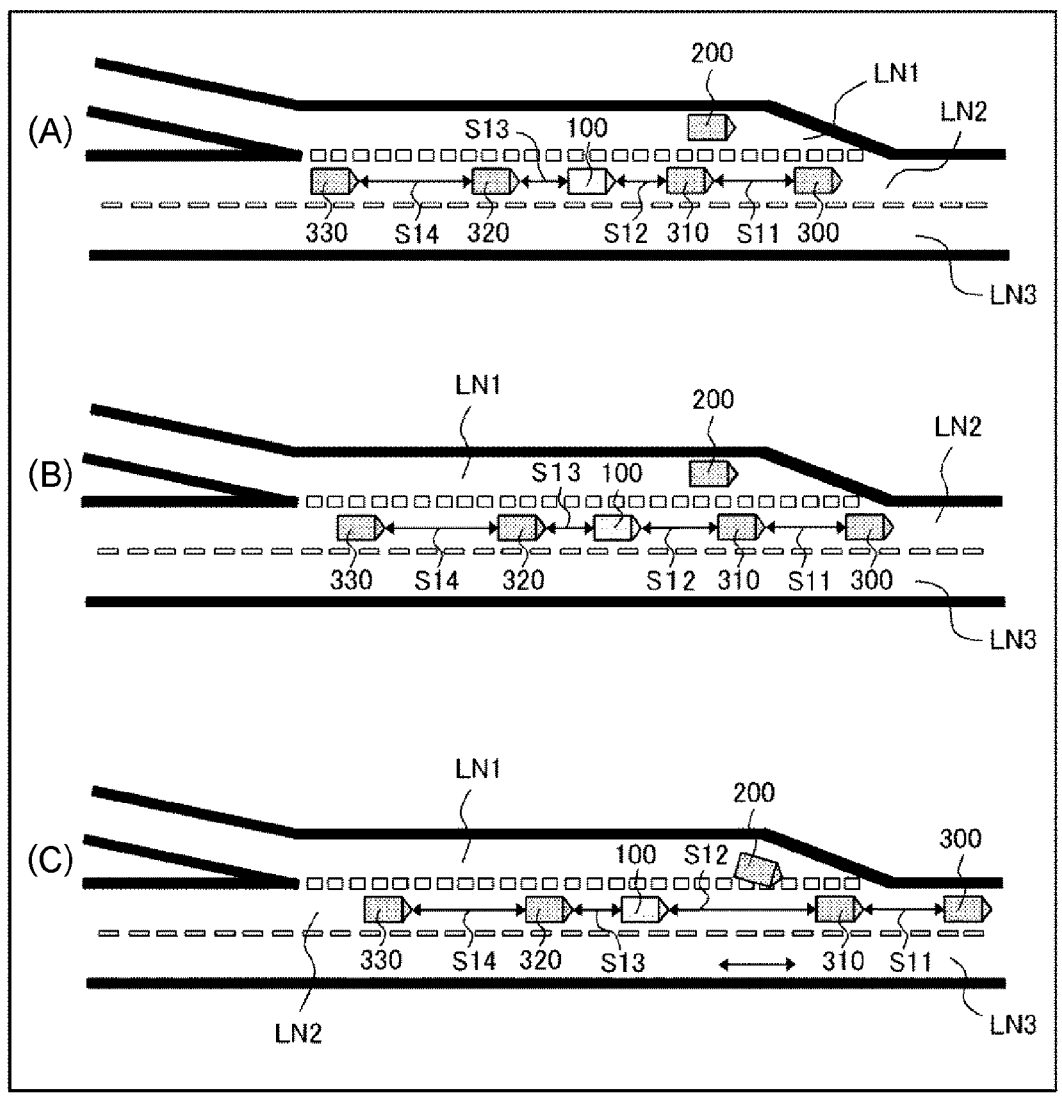
FIG. 14 is a diagram illustrating an example of an operation of the host vehicle controlled by the vehicle control device according to the second embodiment.

FIG. 14 is a diagram illustrating an example of the operation of the host vehicle controlled by the vehicle control device 1A. FIG. 14 illustrates a state in which the lane change of the host vehicle 100 from the host lane LN1 to the adjacent lane LN2 has been completed.

As illustrated in (A) of FIG. 14, since the preceding vehicle 200 (target vehicle) having the lane change request exists in the host lane LN1 (merging lane), the post-lane change control unit 32 calculates whether or not a space around the host vehicle 100 can be secured for the preceding vehicle 200 to change lanes. Here, the surroundings of the host vehicle 100 are a space S12 and a space S13 in the embodiment illustrated in FIG. 14. The post-lane change control unit 32 expands the space S12 while adjusting the speed of the host vehicle 100 when the space S12 in front of the host vehicle 100 can be expanded. Further, if the host vehicle 100 can change lanes to the adjacent lane LN3 (main lane), and thus, the preceding vehicle 200 having the lane change request can change lanes to a vacant space generated by changing the lane of the host vehicle 100, the post-lane change control unit 32 may perform a control so that the host vehicle 100 change lanes to the adjacent lane LN3.

As illustrated in (B) of FIG. 14, the host vehicle 100 reduces the target speed, and thus, the space becomes larger than the space S12 during the normal control. However, since the space required for the preceding vehicle 200 to change lanes cannot be secured, the post-lane change control unit 32 performs a control for adjusting the target speed of the host vehicle 100 again.

As illustrated in (C) of FIG. 14, since the host vehicle 100 can further reduce the target speed to secure the space S12 required for the preceding vehicle 200 to change lanes, the notification device 46 provided in the host vehicle 100 notifies the preceding vehicle 200 of the lane change permission, and the preceding vehicle 200 starts the lane change to the space S12 of the adjacent lane LN2, based on this notification.

In the embodiment described above, in a scene where the host vehicle 100 merges, a case of changing lanes on a two-lane road is described as an example. However, for example, even in a scene where the lanes branch on an expressway, the control by the present control device is applicable.

Next, an example of the movement of the host vehicle 100 controlled by the vehicle control devices 1 and 1A in a branch lane will be described.

Figure 15:
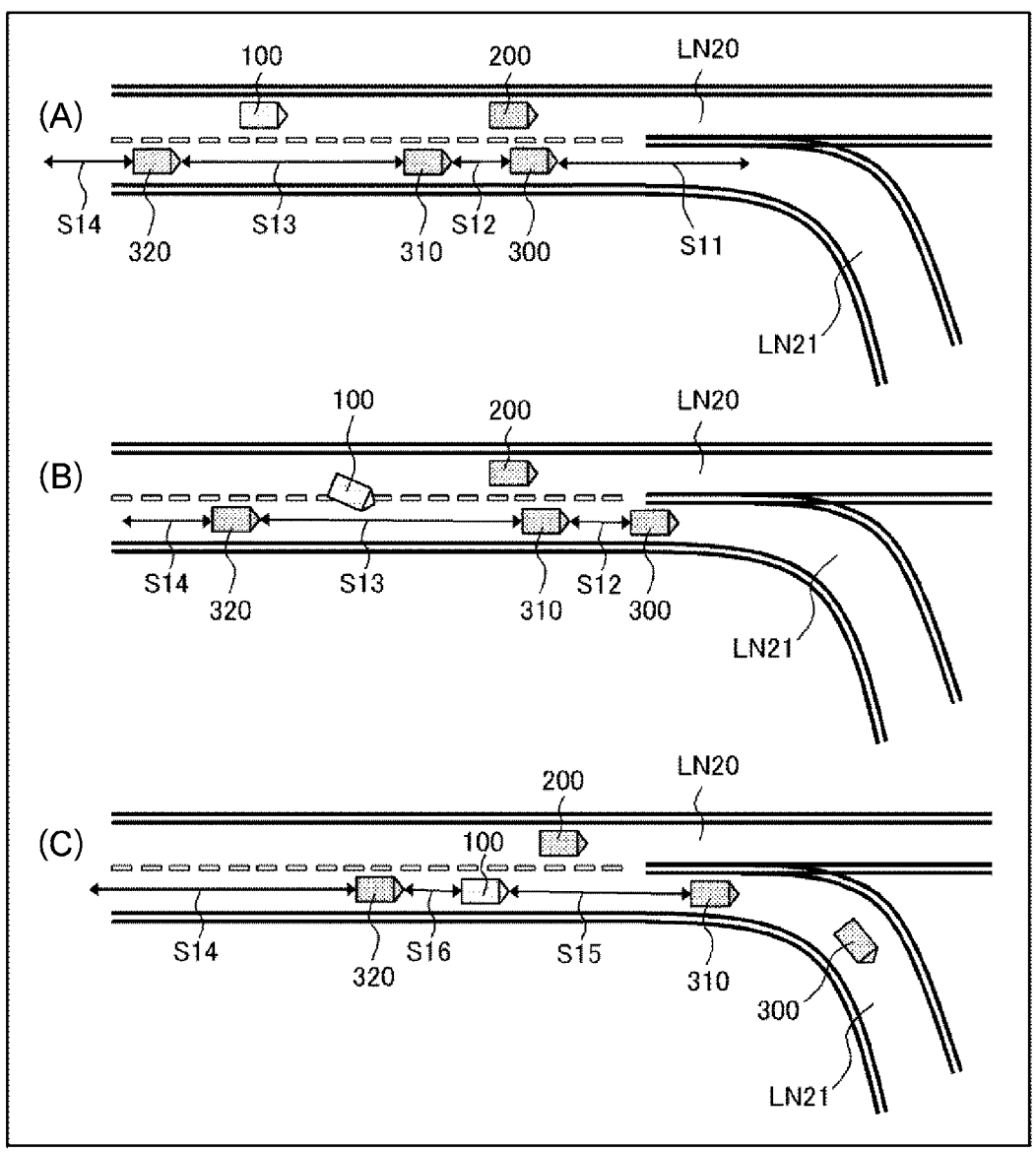
FIG. 15 is a diagram illustrating an example of a movement of a branch lane of the host vehicle controlled by a vehicle control device.

FIG. 15 is a diagram for explaining an example of the movement of the host vehicle 100 controlled by the vehicle control devices 1 and 1A in the branch lane.

In (A) of FIG. 15, it is assumed that both the host vehicle 100 traveling in a first lane LN20 (main lane) and the preceding vehicle 200 have a request to change lanes to the second lane LN21 (branch lane). In this case, since the first lane LN20 does not disappear, the request to change lanes is determined only by the information of the direction indicator of the vehicle.

As illustrated in (B) of FIG. 15, since there is a space S13 in which the host vehicle 100 can change lanes, the vehicle control devices 1 and 1A start the lane change control of the host vehicle 100. In this case, the preceding vehicle 200 having a lane change request cannot change the lane, and thus, the vehicle control devices 1 and 1A changes the lane while reducing the target speed of the host vehicle 100.

As illustrated in (C) of FIG. 15, when the host vehicle 100 has completed the lane change and is traveling in the second lane LN21 (branch lane), the vehicle control device LA adjusts the target speed of the host vehicle 100 so that the space S15 required for the preceding vehicle 200 to change lanes can be secured between the preceding vehicle 200 and the adjacent vehicle 310.

As described above, in the second embodiment, (6) the vehicle control device further includes the post-lane change control unit 32 which controls at least the speed of the host vehicle 100 in the front-rear direction after the host vehicle 100 changes lanes, in which when it is determined that the lane change of the target vehicle traveling in the host lane LN1 is not allowed, after the post-lane change control unit 32 changes the lane of the host vehicle 100 from the host lane LN1 to the adjacent lane LN2, the post-lane change control unit 32 controls the speed of the host vehicle 100 in the front-rear direction to change a size of any space of the host vehicle 100 in the front-rear direction in the adjacent lane LN2 to a size which allows the lane change of the target vehicle.

According to this configuration, the lane change control unit 31 can create the space in which the lane of the target vehicle can be changed after the host vehicle 100 changes lanes, and thus, it is possible to prompt the lane change of the target vehicle. Therefore, the lane can be changed more smoothly without disturbing the flow of traffic on the road.

Third Embodiment

Next, a vehicle control device 1B according to a third embodiment of the present invention will be described. The vehicle control device 1C according to the third embodiment is different from that of the above-described embodiments in that the vehicle control device 1C has a communication unit 50 and a communication device 47 capable of performing inter-vehicle communication between the host vehicle 100 and the other vehicle, determines whether or not the other vehicle is an automatic driving vehicle by the communication with the other vehicle, and performs a control so that the lane change of the host vehicle 100 is performed even if the space in which the lane can be changed is narrowed when the other vehicle is the automatic driving vehicle.

Figure 16:
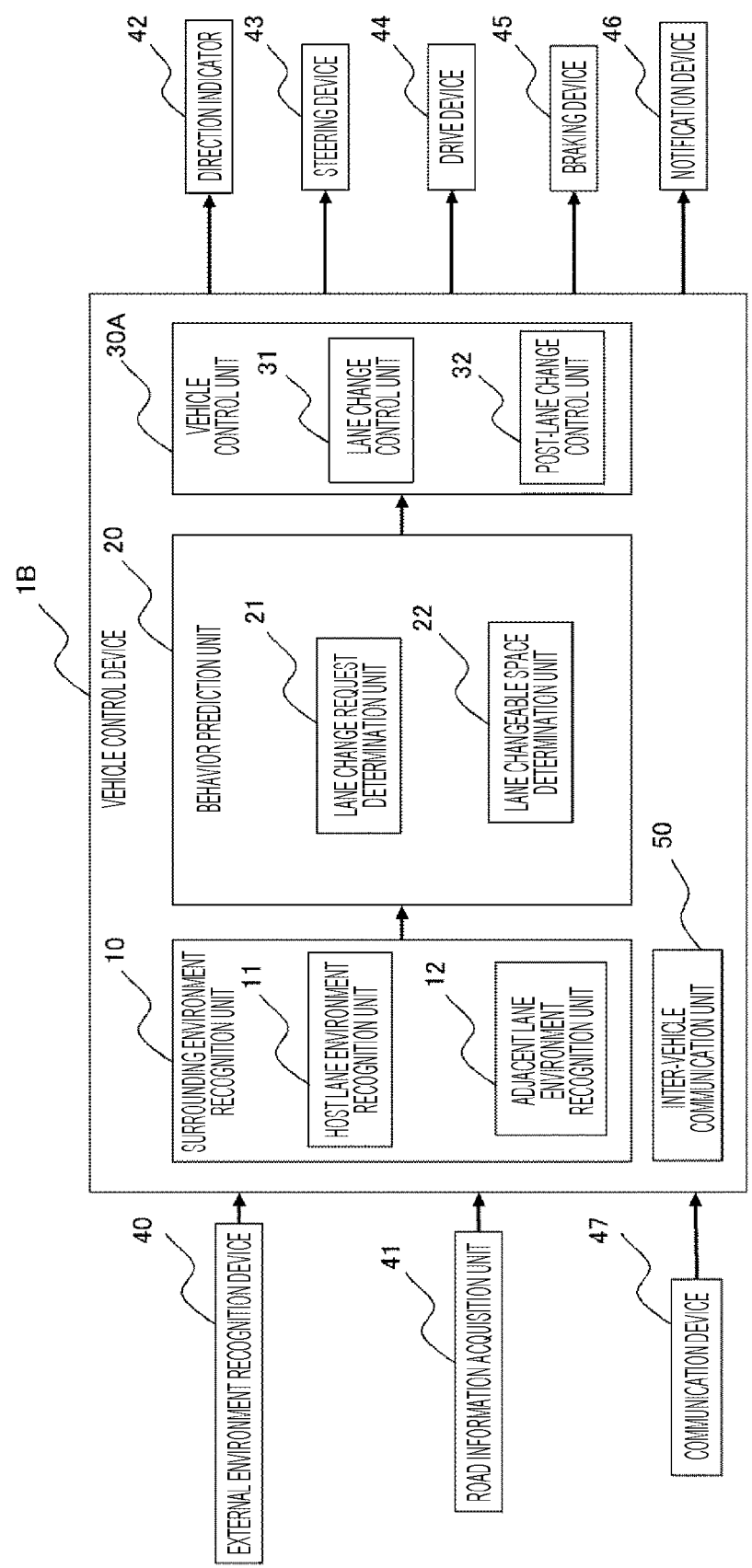
FIG. 16 is a block diagram illustrating a function of a vehicle control device according to a third embodiment.

FIG. 16 is a block diagram illustrating a function of the vehicle control device 1B according to the third embodiment. In the third embodiment, the same components and functions as those in the first embodiment are designated by the same reference numerals and will be described as needed.

As illustrated in FIG. 16, the vehicle control device 1B has an inter-vehicle communication unit 50 which can perform the inter-vehicle communication with the host vehicle 100 and the other vehicle (for example, the preceding vehicle 200 or the adjacent vehicles 300 to 330 described above), or can communicate with a communicator provided on a roadside. The inter-vehicle communication unit 50 is connected to a communication device 47 mounted on the host vehicle 100, and can perform the inter-vehicle communication with other vehicles via the communication device 47. That is, C2X (Car to X: vehicle-to-vehicle or vehicle-to-infrastructure communication) communication can be performed by a system including the inter-vehicle communication unit 47 and the communication device 50 described above.

The vehicle-to-vehicle communication unit 47 determines whether or not the other vehicle on which communication has been performed is the automatic driving vehicle, based on vehicle information acquired from the other vehicle via the communication device 50.

The lane changeable space determination unit 22 change a threshold value of the size of the space determined to be necessary when the host vehicle 100 changes lanes by the inter-vehicle communication unit 47 in a case where the other vehicle is the automatic driving vehicle and, in a case where the other vehicle is a manually driving vehicle.

<Inter-Vehicle Communication Unit Processing>

Next, a process in the vehicle-to-vehicle communication unit 47 will be described.

Figure 17:
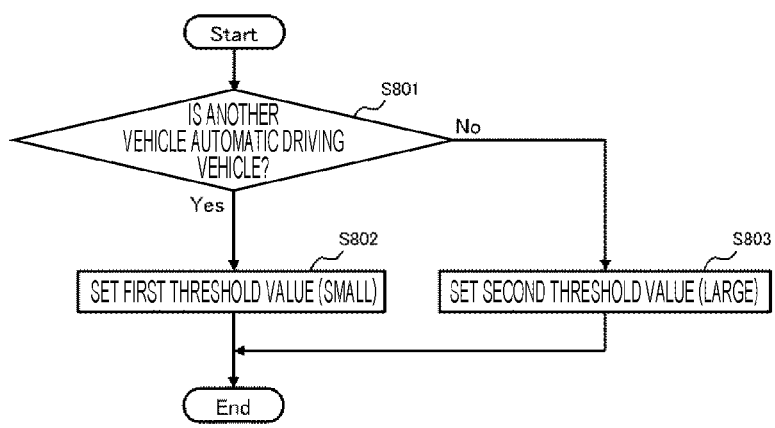
FIG. 17 is a flowchart of processing in an inter-vehicle communication unit according to the third embodiment.

FIG. 17 is a flowchart of the process in the inter-vehicle communication unit 47.

In Step S801, the vehicle-to-vehicle communication unit 47 determines whether or not the other vehicle on which the communication is performed is the automatic driving vehicle as a result of the inter-vehicle communication with the other vehicle via the communication device 50. When the inter-vehicle communication unit 47 determines that the other vehicle on which the communication is performed is the automatic driving vehicle (Step S801: Yes), the process proceeds to Step S802, and when it is determined that the other vehicle on which the communication is performed is not the automatic driving vehicle (Step S801: No), and proceeds to Step S803.

In Step S802, when it is determined that the other vehicle that has communicated with the inter-vehicle communication unit 47 is the automatic driving vehicle, the lane changeable space determination unit 22 sets the size of the space required for the lane change in the adjacent lane to a first threshold value Smin. When both the host vehicle 100 and other vehicles are the automatic driving vehicle, the vehicle can be driven with high accuracy. Accordingly, even if the space required for changing the lane of the host vehicle 100 is minimized according to the accuracy of GPS, it is possible to change lanes safely and reasonably.

Meanwhile, in Step S803, when it is determined that the other vehicle that has communicated with the inter-vehicle communication unit 47 is not the automatic driving vehicle (is the manually driving vehicle), the lane changeable space determination unit 22 sets the size of the space required for changing lanes in the adjacent lane to a second threshold value Smax (Smax>Smin) larger than the first threshold value Smin set when both vehicles are the automatic driving vehicle. When the other vehicle is not the automatic driving vehicle, driving accuracy of the other vehicle largely depends on driving skill of a driver. Therefore, when the other vehicle is not the automatic driving vehicle, it is necessary to increase the space required for the lane change in order to perform the lane change safely and reasonably.

As described above, in the third embodiment, (7) the vehicle control device further includes the inter-vehicle communication unit 47 (communication unit) which communicates with the adjacent vehicles 300 to 330 traveling in the adjacent lane LN2 and determines whether or not the adjacent vehicles 300 to 330 are the automatic driving vehicle based on the communication result with the adjacent vehicles 300 to 330, in which when the inter-vehicle communication unit 47 determines that the adjacent vehicles 300 to 330 are the automatic driving vehicle, the lane changeable space determination unit 22 sets the threshold value Smin used when it is determined whether or not there is the space in which the host vehicle 100 is allowed to change lanes in the adjacent lane LN2 to the value (Smin<Smax) smaller than the threshold value Smax used when it is determined that the adjacent vehicles 300 to 330 are not the automatic driving vehicle.

According to this configuration, when both the host vehicle 100 and the adjacent vehicles 300 to 330 are the automatic driving vehicle, the lane change can be accurately performed without depending on a driving technique of the driver, and thus, even when the inter-vehicle distance is small, it is possible to change lanes safely and comfortably.

(8) Further, the inter-vehicle communication unit 47 is provided so as to be able to communicate with the communicator installed in the host lane LN1 or the adjacent lane LN2, and acquires the information on the target vehicle traveling in the host lane LN1 or the information on the adjacent vehicles 300 to 330 traveling in the adjacent lane LN2 from the communicator, and the lane change control unit 31 adjusts the speed of the host vehicle 100 in the front-rear direction based on the information on the adjacent vehicles 300 to 330 in the adjacent lane LN2 acquired by the inter-vehicle communication unit 47.

According to this configuration, the lane change control unit 31 can appropriately adjust the speed of the host vehicle 100 based on the information on the adjacent vehicles 300 to 330 obtained by the inter-vehicle communication unit 47, and thus, it is possible to efficiently create the space in which the target vehicle can change lanes.

(9) Further, the vehicle control device further includes the communication device 50 which notifies the target vehicle of information via the inter-vehicle communication unit 47, in which communication device 50 notifies the target vehicle of the lane change permission when the space in which the target vehicle is allowed to change lanes can be secured by the speed control of the host vehicle 100 in the front-rear direction.

According to this configuration, the vehicles capable of the inter-vehicle communication can communicate the lane changeable space by communication, and thus, the target vehicle can perform a safe and smooth lane change.

In addition, in the above-described embodiments, the case where the vehicle control device is applied to the lane change control of the vehicle is described as an example. However, the present invention is not limited to the control of the vehicle, and can be applied to the control of various moving bodies which move automatically. For example, the vehicle control device can be applied to control a drone (unmanned aerial vehicle), a robot, a construction machine, or the like.

Hereinbefore, examples of the embodiments of the present invention are described. However, the present invention may be a combination of all the above-described embodiments, or any two or more embodiments may be arbitrarily combined with each other.

Further, the present invention is not limited to the one including all configurations of the above-described embodiments, and some of the configurations of the above-described embodiments may be replaced with the configurations of other embodiments, and the configurations of the above-described embodiments may be replaced with the configurations of other embodiments.

Moreover, some configurations of the above-described embodiments may be added to, deleted from, or replaced with the configurations of other embodiments.

REFERENCE SIGNS LIST 1 vehicle control device
10 surrounding environment recognition unit
11 host lane environment recognition unit
12 adjacent lane environment recognition unit
20 behavior prediction unit
21 lane change request determination unit
22 lane changeable space determination unit
30 vehicle control unit
31 lane change control unit
40 external environment recognition device
41 road information acquisition unit
42 direction indicator
43 steering device
44 drive device
45 braking device
100 host vehicle
200 preceding vehicle
300~330 adjacent vehicle
S1 to S3 space
K target space
LN1 host lane (merging lane)
LN2 adjacent lane
LN3 adjacent lane

The invention claimed is:

1. A vehicle control device configured to perform a control to change a lane of a host vehicle from a first lane to a second lane, comprising:
at least one processor configured to:
acquire information on an operation of another vehicle traveling in the first lane and a road environment;
acquire information on an operation of an adjacent vehicle traveling in the second lane and a road environment;
determine whether or not there is a space in which the host vehicle is allowed to change lanes in the second lane, based on the information on the road environment of the second lane that is acquired; and
determine whether or not the other vehicle traveling in the first lane is allowed to change lanes, based on the operation of the other vehicle traveling in the first lane acquired and the operation of the adjacent vehicle traveling in the second lane,
wherein
the at least one processor is configured to perform a lane change control of the host vehicle, based on a determination of whether or not there is the space in which the host vehicle is allowed to change lanes in the second lane and a determination of whether or not the other vehicle is allowed to change lanes; and
the at least one processor is configured to permit communication via a communicator with the adjacent vehicle traveling in the second lane and determine whether or not the adjacent vehicle is an automatic driving vehicle based on a communication result with the adjacent vehicle, wherein
in response to a determination that the adjacent vehicle is the automatic driving vehicle, the at least one processor is configured to set a threshold value used when it is determined whether or not there is the space in which the host vehicle is allowed to change lanes in the second lane to a value smaller than a threshold value used when it is determined that the adjacent vehicle is not the automatic driving vehicle.

2. A vehicle control device configured to perform a control to change a lane of a host vehicle from a first lane to a second lane, comprising:
at least one processor configured to:
acquire information on an operation of another vehicle traveling in the first lane and a road environment;
acquire information on an operation of an adjacent vehicle traveling in the second lane and a road environment;
determine whether or not there is a space in which the host vehicle is allowed to change lanes in the second lane, based on the information on the road environment of the second lane acquired; and
determine whether or not the other vehicle traveling in the first lane is allowed to change lanes, based on the operation of the other vehicle traveling in the first lane acquired and the operation of the adjacent vehicle traveling in the second lane,
wherein
the at least one processor is configured to perform a lane change control of the host vehicle, based on a determination of whether or not there is the space in which the host vehicle is allowed to change lanes in the second lane and a determination of whether or not the other vehicle is allowed to change lanes,
wherein in a case where a distance from the other vehicle traveling in the first lane to a road shape change position of the first lane is equal to or less than a predetermined distance, or in a case where a direction indicator of the other vehicle is lit and a speed difference between the other vehicle traveling in the first lane and the adjacent vehicle traveling in the second lane is equal to or more than a predetermined speed, the at least one processor is configured to determine that a lane change of the other vehicle traveling in the first lane is not allowed.

3. The vehicle control device according to claim 2, wherein the at least one processor is configured to calculate a size of a space when the other vehicle changes lanes in the second lane in a case where it is determined that the other vehicle traveling in the first lane is allowed to change lanes, permit or continue a lane change of the host vehicle in a case where the size of the space calculated is equal to or more than a predetermined value, and prohibit the lane change of the host vehicle in a case where the size of the space calculated is less than the predetermined value.

4. The vehicle control device according to claim 3, wherein the size of the space calculated by the at least one processor is set to a size in which the host vehicle and the other vehicle traveling in the first lane are allowed to change lanes at the same time.

5. The vehicle control device according to claim 3, wherein in a case where the at least one processor determines that the lane change of the other vehicle traveling in the first lane is not allowed, the at least one processor is configured to control a speed of the host vehicle in a front-rear direction while changing the lane of the host vehicle from the first lane to the second lane to change a size of any space of the host vehicle in the front-rear direction in the second lane to a size which allows the lane change of the other vehicle.

6. The vehicle control device according to claim 3, wherein the at least one processor is configured to control at least a speed of the host vehicle in the front-rear direction after the host vehicle changes lanes, wherein
in a case where it is determined that the lane change of the other vehicle traveling in the first lane is not allowed, after the at least one processor changes the lane of the host vehicle from the first lane to the second lane, the at least one processor is configured to control the speed of the host vehicle in the front-rear direction to change a size of any space of the host vehicle in the front-rear direction in the second lane to a size which allows the lane change of the other vehicle.

7. The vehicle control device according to claim 1, wherein
the communicator is configured to communicate with a communicator installed in the first lane or the second lane, and acquire information on the other vehicle traveling in the first lane or information on the adjacent vehicle traveling in the second lane from the communicator, and
the at least one processor is configured to adjust the speed of the host vehicle in the front-rear direction based on the information on the adjacent vehicle in the second lane acquired by the communicator.

8. The vehicle control device according to claim 7, further comprising a communication device which notifies the other vehicle of information via the communicator, wherein
the communication device is configured to notify the other vehicle of a lane change permission in a case where a space in which the other vehicle is allowed to change lanes can be secured by the speed control of the host vehicle in the front-rear direction.

9. A control method of performing control to change a lane of a host vehicle from a first lane to a second lane, comprising:
acquiring information on an operation of another vehicle traveling in the first lane and a road environment;
acquiring information on an operation of an adjacent vehicle traveling in the second lane and a road environment;
determining whether or not there is a space in which the host vehicle is allowed to change lanes in the second lane, based on the acquired information on the road environment of the second lane;
determining whether or not the other vehicle traveling in the first lane is allowed to change lanes, based on the acquired operation of the other vehicle traveling in the first lane and the operation of the adjacent vehicle traveling in the second lane;
performing a lane change control of the host vehicle, based on a determination of whether or not there is the space in which the host vehicle is allowed to change lanes in the second lane and a determination of whether or not the other vehicle is allowed to change lanes; and
communicating with the adjacent vehicle traveling in the second lane and determining whether or not the adjacent vehicle is an automatic driving vehicle based on a communication result with the adjacent vehicle, wherein
in a case of determining that the adjacent vehicle is the automatic driving vehicle, setting a threshold value used when it is determined whether or not there is the space in which the host vehicle is allowed to change lanes in the second lane to a value smaller than a threshold value used when it is determined that the adjacent vehicle is not the automatic driving vehicle.

* * * * *